Dec. 30, 1941.  J. ASKIN  2,268,369
METHOD OF SOLDERING FABRICATED ASSEMBLIES

Filed May 13, 1940

INVENTOR
Joseph Askin
BY
ATTORNEY

Patented Dec. 30, 1941

2,268,369

UNITED STATES PATENT OFFICE 2,268,369

METHOD OF SOLDERING FABRICATED ASSEMBLIES

Joseph Askin, Buffalo, N. Y., assignor to Fedders Manufacturing Company, Inc., Buffalo, N. Y.

Application May 13, 1940, Serial No. 334,713

4 Claims. (Cl. 113—112)

This invention relates to a method and means for soldering the joints of the elements of cellular or laminated structures, such as radiators, oil coolers, and the like.

In the practice of the present process it is proposed to assemble the parts to be soldered in a frame or box, and to locate and to retain such parts in proper position through the aid of specially formed strips of solder alloy. The fusing of the solder is effected by the immersion of the entire assembly in a fused salt bath, and the simultaneous maintenance of mechanically applied pressure on the assembly during such immersion. This procedure insures the formation of proper joints, since the solder may be positioned between the joint surfaces directly, and as a result, when the solder is melted it spreads and contacts joint areas which would otherwise be difficult to reach.

The invention is more specifically set forth in the accompanying specification and drawing, wherein.

Figure 1:
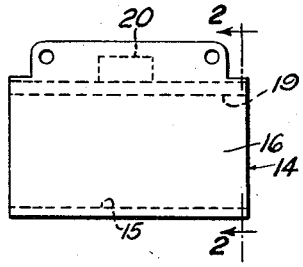
Fig. 1 is a side elevation of the soldering box.

The invention is shown as organized to solder a radiator core 10 of the tube bundle type, whose components consist of a plurality of cylindrical tubes 11 having enlarged hexagonal heads 12. As is well known in the art, the tubes may be nested with the surfaces 12a of the heads 12 in contact to form a typical cellular arrangement. The tubes are formed of copper or brass, and they usually are of a thin walled section of about six-thousandths of an inch.

The apparatus used in the soldering process consists of a holding fixture or box 14 of alloy steel having bottom and side walls 15 and 16, respectively, which walls are proportioned to the size and shape of the radiator core to be assembled. The ends and the top of the box 14 are open.

Figure 2:
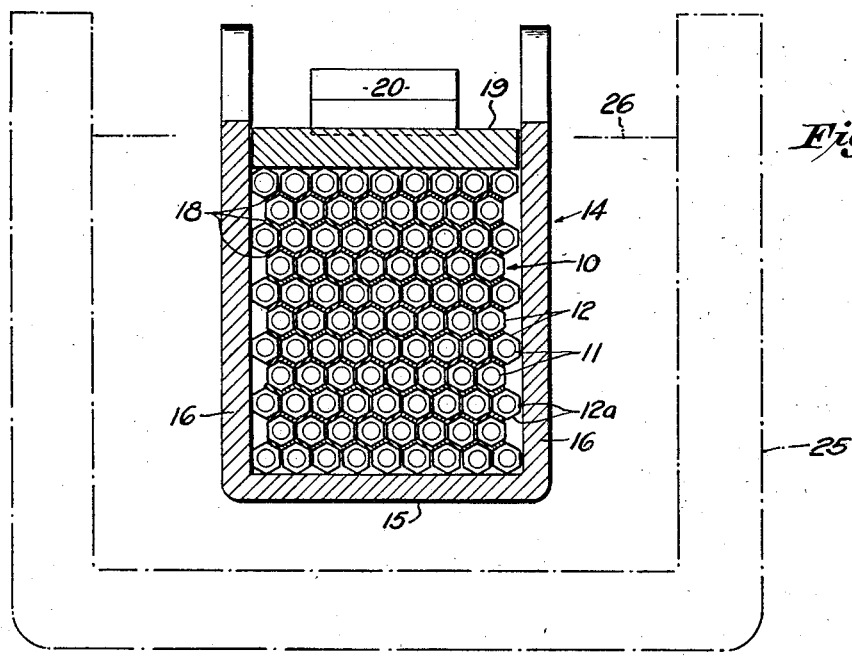
Fig. 2 is an enlarged section on the line 2—2 of Fig. 1.
Figure 3:
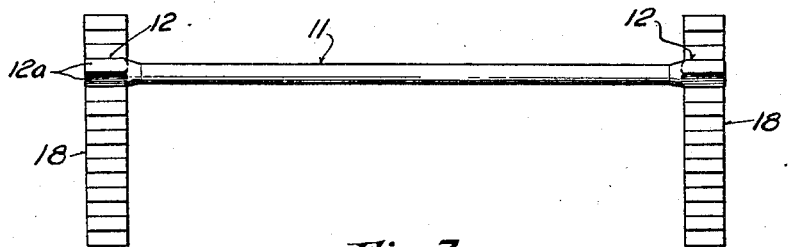
Fig. 3 is a top view of the solder insert strips showing also a tube positioned upon the strips.

The tubes are assembled directly in the box, wherein they are laid in successive horizontal rows, as shown in Fig. 2. It will be observed that narrow solder strips 18, which preferably are pre-formed or corrugated (Fig. 3), are placed between the heads 12 of successive rows. Such strips perfectly match the shape of the heads 12, so that the interposition thereof does not affect the nesting of the tubes. From a purely mechanical viewpoint, it will be understood that the strips 18 at this point in the process serve as auxiliary fixtures, since they serve as guides to insure the proper spacing and alignment of the tubes.

After the core is built up to the desired height, a cover 19 is placed on the upper row of tubes.

The cover 19 is slidably mounted between the side walls 16 of the box, so that it is free to press down upon the underlying tubes. A weight or weights 20 may be placed on the cover to increase the pressure on the tubes.

The box and assembled core therein are now immersed in a bath of molten salts and retained therein for a time sufficient to permit the fusing of the solder strips 18. It is preferred that the tubes be retained in a horizontal position during this step, so that the salts may flow freely into the ends of the tubes. Inasmuch as the solder strips 18 are positioned directly between the joint faces of the core, it will be apparent that, upon melting, the strips will rapidly disperse either by gravitational or capillary action between all of the contacting surfaces 12a of the tube heads 12.

During the melting of the insert strips 18, the rows of tubes will tend to settle into closer conformity, and this readjustment takes place automatically, due to the pressure of the overlying cover 19 and accompanying weights 20. The cover thus serves as a pressure pad which accommodates itself to the rise and fall of the core mass, which movement may be caused by expansion and contraction of the tubes and/or the melting and subsequent setting of the solder when the box is removed from the salt bath.

Inasmuch as molten salt furnaces are well known in the art, there is shown diagrammatically in Fig. 2 only the tank 25 thereof, with the salts level indicated by the numeral 26. It will be understood, therefore, that the temperature of the bath is maintained within close limits at the point where it will readily melt the solder strips 18.

The above outlined method is particularly advantageous when high melting point spelter or solder is demanded, although it will be understood that it may also be used with ordinary solders. When the cores are to be used as radiators or oil coolers for aeronautical installation, for example, silver soldering is demanded, in which melting temperatures are above 1000° F. In such cases, the strips 18 are formed of the required solder alloy, which, to cite an example, may consist approximately of the following components:

| | Per cent |
|---|---|
| Silver | 50 |
| Copper | 16 |
| Zinc | 16 |
| Cadmium | 18 |

It will be appreciated from the foregoing that the solder in itself may be a costly item in radiator structures, and that the present process lends itself to strict economy thereof, since the solder quantity may be accurately predetermined by the thickness of the insert strips 18, and further, the advantageous positioning of the strips directly within the joints insures its ultimate location at points only where it is required.

It has been found that the present process readily adapts itself to high temperature soldering of numerous other types of laminated or cellular assemblies. It will therefore be understood that, although the process is especially suited to the type of structure herein described, the invention may be used on other structures or on other shapes or forms of radiators without departing from the inventive principle, as set forth in the following claims.

I claim:

1. The method of soldering cores formed of headed radiator tubes of the type described, which consists in assembling the tubes in a box with strips of soldering material interposed between the heads of successive rows of tubes, placing the assembly under a predetermined and constant degree of compression by the application of a self-adjusting mechanical force to one side of the assembly lateral to said strips, fusing said solder strips while under such compression by immersing the assembly in a bath of molten salt, and finally in removing the assembly from the bath to permit the cooling and setting of the solder.

2. The method of soldering cores formed of headed radiator tubes of the type described, which consists in assembling the tubes in nested relation with strips of soldering material interposed between the heads of successive rows of tubes, placing the assembly under a predetermined and constant degree of compression by the application of a self-adjusting mechanical force to one side of the assembly lateral to said strips, fusing such solder strips while under such compression by immersing the assembly in a bath of molten salt, and finally in removing the assembly from the bath to permit the cooling and setting of the molten solder.

3. The method of soldering cores formed of headed radiator tubes of the type described, which consists in assembling the tubes in nested relation with strips of soldering material interposed between the heads of successive rows of tubes, placing the assembly under a predetermined and constant degree of compression by the application of a gravitational load to one side of the assembly lateral to said strips, fusing such solder strips while under such compression by immersing the assembly in a bath of molten salt with the tubes held in a horizontal position, and finally in removing the assembly from the bath to permit the cooling and setting of the molten solder.

4. The method of integrating contacting end surfaces of an assembled bundle of tubes each of which is formed with a polygonal end section whose surfaces contact similar surfaces on adjacent tubes, which comprises positioning a layer of such tubes in parallelism in an open-ended box, placing narrow strips of pre-formed solder material over the upper surfaces of the polygonal ends, superimposing a second layer of tubes and solder strips to form the tube bundle with the pre-formed strips interposed between the rows of tubes, whereby the pre-formed strips and the sides of the open-ended box serve as guides for positioning all of said tubes, and immersing the box and contained tubes and solder strips in a molten salt bath maintained at a temperature adequate to cause the fusing of the solder strips.

JOSEPH ASKIN.